US010957210B2

(12) United States Patent
Fitzpatrick-Nash

(10) Patent No.: US 10,957,210 B2
(45) Date of Patent: Mar. 23, 2021

(54) LANGUAGE-ADAPTED USER INTERFACES

(71) Applicant: Shanghai Index Ltd., Tortola (VG)

(72) Inventor: Timothy Fitzpatrick-Nash, London (GB)

(73) Assignee: Education Index Management Asia Pacific Pte. Ltd., Singapore (SG)

( * ) Notice: Subject to any disclaimer, the term of this patent is extended or adjusted under 35 U.S.C. 154(b) by 155 days.

(21) Appl. No.: 16/002,237

(22) Filed: Jun. 7, 2018

(65) Prior Publication Data

US 2019/0139427 A1  May 9, 2019

(30) Foreign Application Priority Data

Aug. 8, 2017 (SG) .............................. 10201706479X

(51) Int. Cl.
*G09B 5/06* (2006.01)
*G06F 3/01* (2006.01)
(Continued)

(52) U.S. Cl.
CPC ............... *G09B 5/06* (2013.01); *G06F 3/018* (2013.01); *G06F 3/0486* (2013.01);
(Continued)

(58) Field of Classification Search
None
See application file for complete search history.

(56) References Cited

U.S. PATENT DOCUMENTS 5,359,707 A * 10/1994 Sato ..................... G06F 40/53
715/246
6,542,090 B1 * 4/2003 Tadano .................. G06F 3/018
341/20
(Continued)

FOREIGN PATENT DOCUMENTS

| CN | 101241656 A | 8/2008 |
| CN | 101593438 A | 12/2009 |
| CN | 103299254 A | 9/2013 |

OTHER PUBLICATIONS

Search Report for patent application GB1809037.3, The Intellectual Property Office for the United Kingdom, dated Nov. 29, 2018.

*Primary Examiner* — Jason T Yen
(74) *Attorney, Agent, or Firm* — Porter, Wright, Morris & Arthur, LLP

(57) ABSTRACT

A computer-implemented training system includes data storage storing: (i) a first set of visual instruction materials, (ii) a second set of audio instruction materials, and (iii) a set of user data. The user data includes, for each user, (a) a first indication of a visual instruction status and (b) a second indication of an audio instruction status. Also stored is a presentation control processing arrangement configured for selecting an instruction material of the first set or the second set and causing it to be presented to a user. The presentation control processing arrangement is configured to, for a specific user, select one of (a) a visual instruction material from the first set based on the first indication for that user and (b) an audio instruction material from the second set based on the second indication for that user, and presenting the selected instruction material to the user.

10 Claims, 3 Drawing Sheets

(51) Int. Cl.
*G10L 13/027* (2013.01)
*G06F 3/0486* (2013.01)
*G09G 5/02* (2006.01)
*G06F 40/40* (2020.01)
*G06K 9/72* (2006.01)
*G06F 40/242* (2020.01)
*G06F 40/247* (2020.01)
*G06F 40/237* (2020.01)
*G06F 40/30* (2020.01)

(52) U.S. Cl.
CPC .......... *G06F 40/237* (2020.01); *G06F 40/242* (2020.01); *G06F 40/247* (2020.01); *G06F 40/30* (2020.01); *G06F 40/40* (2020.01); *G06K 9/72* (2013.01); *G09G 5/02* (2013.01); *G10L 13/027* (2013.01); *G06K 2209/01* (2013.01)

(56) References Cited

U.S. PATENT DOCUMENTS

| | | | | |
|---|---|---|---|---|
| 2003/0236658 | A1* | 12/2003 | Yam | G06F 40/55 704/2 |
| 2005/0099408 | A1* | 5/2005 | Seto | G06F 3/018 345/179 |
| 2011/0188756 | A1* | 8/2011 | Lee | G06K 9/18 382/185 |
| 2012/0274803 | A1* | 11/2012 | Nako | G06K 9/228 348/222.1 |
| 2015/0325145 | A1* | 11/2015 | Seo | G09B 5/065 434/157 |
| 2016/0042662 | A1* | 2/2016 | Lin | G09B 19/08 434/157 |

\* cited by examiner

LANGUAGE-ADAPTED USER INTERFACES

FIELD OF THE INVENTION

This invention relates to user interface features that are adapted to take account of features that are specific to certain languages.

BACKGROUND OF THE INVENTION

Many user interfaces are capable of being configured to operate in ways that are specifically adapted for different languages. For example, it is common for an electronic device, or a software interface such as that presented by a website, to be capable of presenting its user interface in any of a number of languages, and for a user to be able to select which language is to be used. Typically, the underlying operation of the device or software is the same whichever language it is operating in. To adapt it for different languages, the system substitutes words in one language for those in another language.

One area where the mechanism for presenting linguistic information to users is especially significant is in language teaching. When users are not familiar with a language, it is important that the interface used to teach them is especially easy to use.

In languages such as English and French, which use essentially alphabetic characters, there is a close link between the visual presentation of a word and its pronunciation. This makes it possible to teach the oral and written skills of these languages without significant confusion between the two fields. In contrast, in languages that use logographic characters, the visual presentation of a character does not necessarily carry an implication as to its pronunciation. Also, in logographic languages, characters can frequently be combined to form new words which may be variants on the concepts conveyed by the constituent characters but may be pronounced differently. In a traditional classroom setting these complications can be mitigated by a teacher explaining certain linguistic features when they cause confusion, adapting the lesson depending on questions that arise from pupils, and by conducting lessons that are—for example—entirely oral. However, in modern teaching methods that rely on a user learning through an electronic device these adaptations are difficult to achieve. It is hard to design an electronic system that allows a student to give subtle feedback about linguistic misunderstandings in a language that is unfamiliar to the student. Most students are used to relying on a visual user interface more than an audio interface. This makes it difficult to design the user interface of a system for teaching logographic languages so as to effectively separate visual learning from audio learning.

SUMMARY OF THE INVENTION

According to one aspect there is provided a computer-implemented training system comprising: data storage storing in a non-transient manner: (i) a first set of visual instruction materials, (ii) a second set of audio instruction materials and (iii) a set of user data comprising, for each of a plurality of users, (a) a first indication of a visual instruction status and (b) a second indication of an audio instruction status; and a presentation control processing arrangement configured for selecting an instruction material of the first set or the second set and causing it to be presented to a user; the presentation control processing arrangement being configured to, for a specific user, select one of (a) a visual instruction material from the first set in dependence on the stored first indication for that user and (b) an audio instruction material from the second set in dependence on the stored second indication for that user, and to cause the selected instruction material to be presented to the user.

The presentation control processing arrangement may be configured to update the first indication for a user in response to the presentation to that user of a material of the first set.

The first set may comprise test materials and the presentation control processing arrangement may be configured to, on presenting a test material of the first set to a user: receive from the user data representing a response to the test material; compare the response to a predetermined model response; and update the first indication for the user in dependence on that comparison.

The presentation control processing arrangement may be configured to update the second indication for a user in response to the presentation to that user of a material of the second set.

The second set may comprise test materials and the presentation control processing arrangement may be configured to, on presenting a test material of the second set to a user: receive from the user data representing a response to the test material; compare the response to a predetermined model response; and update the second indication for the user in dependence on that comparison.

The visual instruction materials of the first set may comprise written language training materials.

The visual instruction materials of the first set may exclude spoken language training materials.

The audio instruction materials of the second set may comprise spoken language training materials.

The audio instruction materials of the second set may exclude written language training materials.

The language training materials may be for training in a logographic language.

According to a second aspect there is provided a computer system configured to implement a user interface for the teaching of a logographic language, the system being configured to: select a word in the logographic language that is represented in the language by multiple written characters; cause multiple placeholder icons to be displayed to a user of the system, there being one placeholder icon for each character of the selected word; enabling a user to select one of the placeholder icons; and in response to the selection of one of the placeholder icons causing information to be presented to the user relating to a corresponding character of the multicharacter word.

Each placeholder icon may have an appearance different from the appearance of any character in the logographic language.

All the placeholder icons may have the same appearance.

The placeholder icons may be geometric shapes of a common (i.e. the same) colour.

The placeholder icons may be displayed side-by-side.

Each placeholder icon may correspond to the character of the selected word having the same order in the selected word as the respective placeholder icon in the set of placeholder icons.

The system may be configured to, in response to the selection of one of the placeholder icons, cause information to be presented to the user that is one of (i) the meaning of the corresponding character of the multicharacter word in isolation and (ii) other words that comprise the corresponding character of the multicharacter word.

The system may be configured to, in response to the selection of one of the placeholder icons, cause information to be presented to the user that is the pronunciation of the corresponding character of the multicharacter word, The system may be configured to present the pronunciation to the user in audio form.

The system may be configured to enable the user to re-order the placeholder icons on a display.

The system may be configured to enable the user to re-order the placeholder icons by selecting one of the displayed placeholder icons in a first ordered position relative to the or each other displayed placeholder icon and moving it to a different ordered position relative to the or each other displayed placeholder icon.

The system may be configured to enable the user to re-order the placeholder icons by dragging and dropping.

The system may be configured to: initially display the placeholder icons such that not all of the placeholder icons correspond to the character of the selected word having the same order in the selected word as the respective placeholder icon in the set of placeholder icons; and in response to the user re-ordering the placeholder icons such that each placeholder icon corresponds to the character of the selected word having the same order in the selected word as the respective placeholder icon in the set of placeholder icons, present a message to the user.

BRIEF DESCRIPTION OF THE DRAWINGS

The present invention will now be described by way of example with reference to the accompanying drawings.

In the drawings.

DETAILED DESCRIPTION OF CERTAIN DISCLOSED EMBODIMENTS

Figure 1:
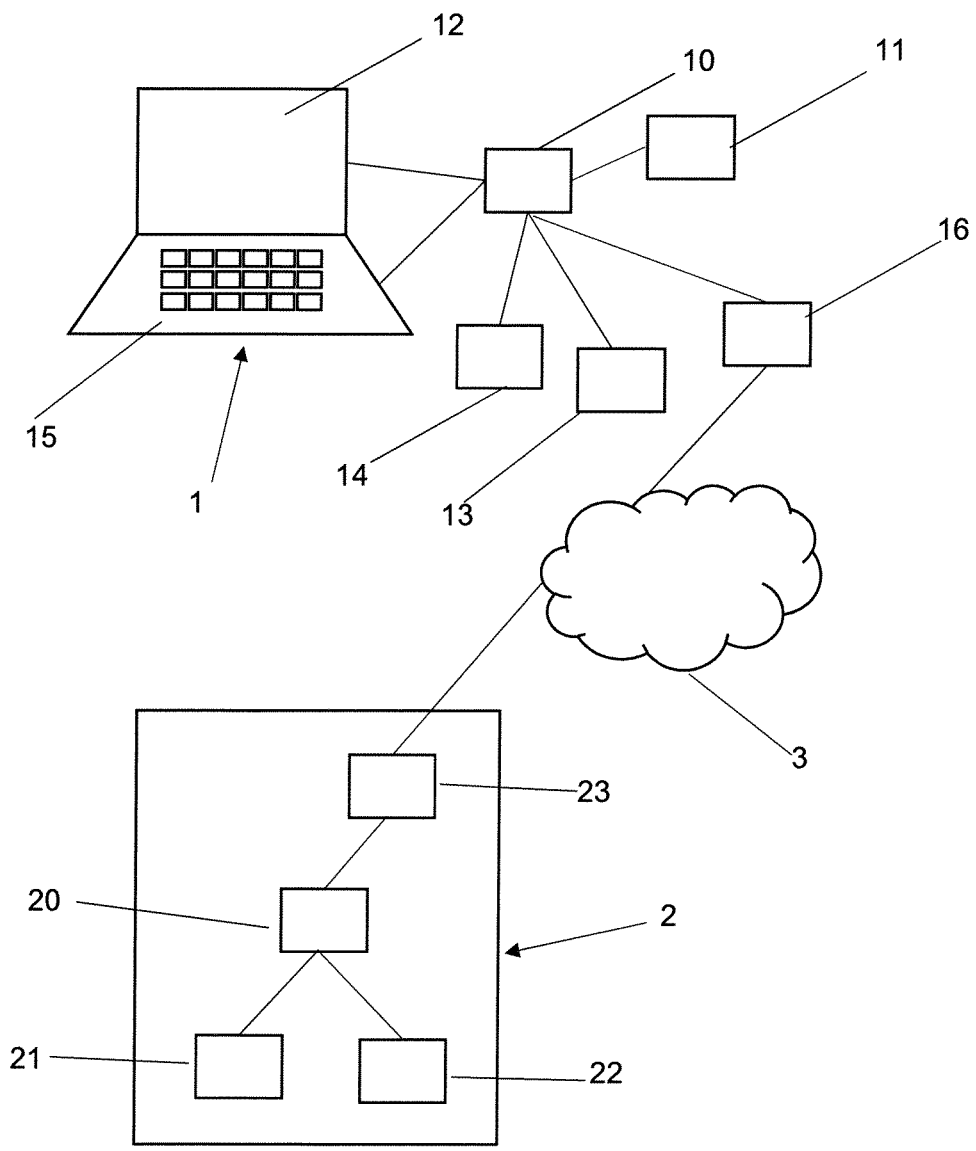
FIG. 1 shows the physical architecture of a system providing a user interface.

FIG. 1 shows the physical architecture of a system providing a user interface. In this example, the system provides the interface through a web browser over the internet. As will be discussed below, the interface may be provided in other ways, for example locally to an end user.

FIG. 1 shows a user device 1 capable of communicating with a server device 2 over a network 3. The network may be a publicly accessible network such as the internet. The user device comprises a processor 10. The processor 10 is coupled to a memory 11, a display 12, a loudspeaker 13, a microphone 14, a keyboard 15 and a communication interface 16. The memory 11 stores in a non-transient way program code that is executable by the processor to cause it to perform the functions described of it herein. The processor 10 is capable of receiving user input from the microphone and the keyboard and of controlling the display and the loudspeaker to present information to a user. The keyboard and the display may be integrated in the form of a touchscreen. The communication interface is communicatively coupled to the network 3 for transmitting data to the server 2 over the network and for receiving data from the server over the network. The communication interface may be a wired or wireless interface. The user device may take any suitable form. For example it may be a personal computer, a tablet, a smart phone or a dedicated teaching station or kiosk.

The server 2 comprises a processor 20. The processor 20 is coupled to a program memory 21, a state memory 22 and a communication interface 23. The program memory 21 stores in a non-transient way program code that is executable by the processor 20 to cause it to perform the functions described of it herein. The state memory stores in a non-transient way data representing the state of the server's operations. The communication interface 23 is communicatively coupled to the network 3 for transmitting data to the user device 1 over the network and for receiving data from the user device over the network. The communication interface may be a wired or wireless interface. The server may take any suitable form. For example, it may be a server computer or any other form of computing device. The server may communicate with the user terminal by means of a standard internet protocol such as HTTP or HTTPS. The server may act as a web server. The user terminal may interpret data received from the server by means of multi-purpose interpretation application software such a web browser. Alternatively, the server may communicate with a dedicated software application running on the user terminal, optionally by means of a proprietary communication protocol.

In the example illustrated in FIG. 1, the user terminal 1 may be remote from the server 2. It is alternatively possible for the server and the user terminal to be integrated into a single device. Then the communication interfaces 6, 23 may be omitted and the program memories 11, 21 may be merged.

The program memory 21 and the state memory 22 may be merged into a single physical unit. The memories 21, 22 may be co-located with the processor 20 or may be located elsewhere.

The operation of the system of FIG. 1 will now be described.

The user device initiates a communication session with the server. This may involve the user of the user device authenticating themselves to the server, for example by means of a user name and password. The processor 20 of the server may then interrogate the state memory 22 to determine information about the state of the user's previous and intended interactions with the server. The processor then causes the server to transmit data to the user device. In response to that data, the processor 10 of the user device causes information to be presented to the user by means of the display 12 and/or the loudspeaker 13. The received data may cause the user device to receive input from the user, for example by speaking (which can be received by the microphone 14), typing on the keyboard 15 or making input by another mechanism such as moving a mouse or making a gesture on a touch screen. The processor 10 then causes data representing the user input to be transmitted from the user device 1 to the server 2. In response to that data, the processor 20 of the server can store information in state memory 22. The processor 20 of the server can then transmit further data to the user device.

The architecture of FIG. 1 may be used to implement a language teaching system. A student may use the user device 1 to communicate with the server 2 in the manner described above. The server may implement a teaching program which causes the user to be presented with learning information and tests. Based on input received from the user the teaching program can be adapted: for example to present new material on request from the user or to revisit parts of the curriculum that a user has proved in a test to be unfamiliar with.

The teaching program may be configured in several ways to be especially suitable for teaching the use of logographic languages. Examples of such languages are Mandarin Chinese, Japanese, Korean and Vietnamese. However, the present system may be used with non-logographic languages.

When the server 2 is configured to provide teaching to multiple students, a record for each student can be held in state memory 22. That record may store information about the identity of the student. It may also store information about the student's level of progress so far: for example which lessons they have completed, which tests they have completed and the results of those tests. It may also store information about (a) the words, characters or phrases to which the student in question has been exposed through the teaching program and (b) the words, characters or phrases that the student with which the student has demonstrated their knowledge or proficiency in a test. These latter types of information may be taken as indicative of the user's familiarity with aspects of the curriculum.

The server 2 may be configured to present contextual teaching materials to a student and or to present tests to a student in dependence on the state information stored in respect of that student. In one aspect, the server may store a set of reading or listening materials. These may be phrases, sentences or longer passages that can be shown, through the display of written characters, or presented audibly, through the playout of audio clips of spoken language, to a user. The server may be configured to present the user with one of two types of lesson. In a first, teaching type of lesson, the server is configured to present the user with one or more stored materials which comprise one or more elements (e.g. characters, words or phrases) that are not indicated by the state information stored for the user to be ones with which the user is familiar. In a second, reinforcement type of lesson, the server is configured to present the user only with stored materials which consist of elements that are indicated by the state information stored for the user as being ones with which the user is familiar. This feature enables the system to make use of arbitrary texts and other materials that can be loaded into the server by administrative users. In a conventional learning system, reading and listening materials are defined in advance of a teaching program and are presented in a predefined order to students. Using the mechanisms described above, new materials can be stored in the server. Then the processor 20 can implement a stored algorithm to select one of the stored materials as being suitable for a reinforcement lesson for a particular user. The selection can be dependent on the user's abilities as indicated by their state information. in this way, different users may be presented with materials in different sequences depending on their progress in different aspects.

Figure 2:
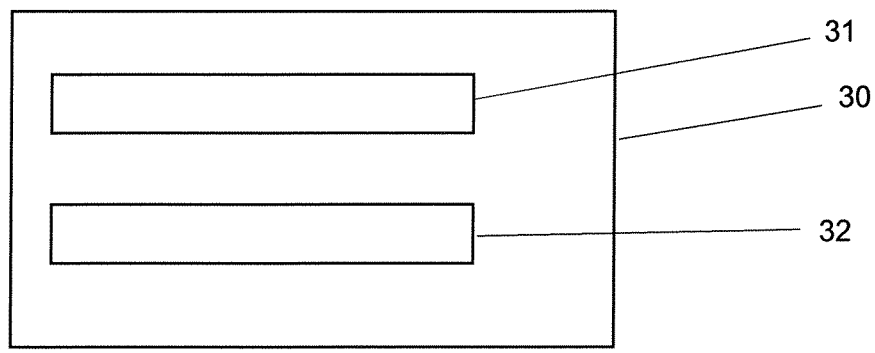
FIG. 2 shows the structure of a state memory.

The processor 20 is configured to store, for each student, information separately indicating the student's familiarity with different aspects of the curriculum. FIG. 2 shows the logical structure of a student record 30 held in the state memory 22. An area 31 stores data indicating the student's familiarity with written language elements. For example, it may store any one or more of: (i) a list of written language elements (e.g. characters, words or phrases) that have been presented visually to the student, and optionally an indication of the number of times each such element has been presented visually to the student; (ii) a list of written language elements that have been input by the student in a written or other visually-orientated manner, and optionally an indication of the number of times each such element has been input in such a manner by the student; and (iii) results of testing the student on a list of written language elements, indicating whether or not the student has demonstrated familiarity with the elements in testing. An area 32 stores data indicating the student's familiarity with spoken language elements. For example, it may store any one or more of: (i) a list of spoken language elements (e.g. characters, words or phrases) that have been presented audibly to the student, and optionally an indication of the number of times each such element has been presented audibly to the student; (ii) a list of spoken language elements that have been input in an oral or other audibly-oriented manner (e.g. selection by the user from a number of sound clips), and optionally an indication of the number of times each such element has been input by the student; and (iii) results of testing the student on a list of spoken language elements, indicating whether or not the student has demonstrated familiarity with the elements in testing. Thus, the memory 22 stores, for a student, separate information indicating the student's familiarity with written and spoken language. This is especially significant for logographic languages in which there may be no implied relationship between the visual appearance of a character and its pronunciation. Areas 31 and 32 are logically separate but may be stored in physical memory in any convenient fashion.

When the processor 20 of the server 2 is selecting one of a set of stored contextual materials to be presented to a user for a teaching or revision lesson, it may make use independently of the data stored in areas 31 and 32. If the lesson is a written language lesson then it selects from a set of stored written materials in dependence on the user's familiarity with written elements as indicated by the data in area 31. If the lesson is a spoken language lesson then it selects from a set of stored spoken materials in dependence on the user's familiarity with spoken elements as indicated by the data in area 32. Dividing the selection of materials in this way may have a number of advantages for the automated teaching of logographic languages. It allows the student to proceed at different rates in their written and spoken language development. It reduces the possibility that the user may find a lesson overly difficult because it relies on a written or spoken element with which the student is unfamiliar. Separating a student's progress in written aspects of language learning from their progress in spoken aspects of language learning is especially valuable in the teaching of logographic languages because in such languages a user may effectively learn the visual aspects of a character, word or phrase independently of the audio aspects of the character, word or phrase. This can allow the student to proceed more quickly and smoothly.

Figure 3:
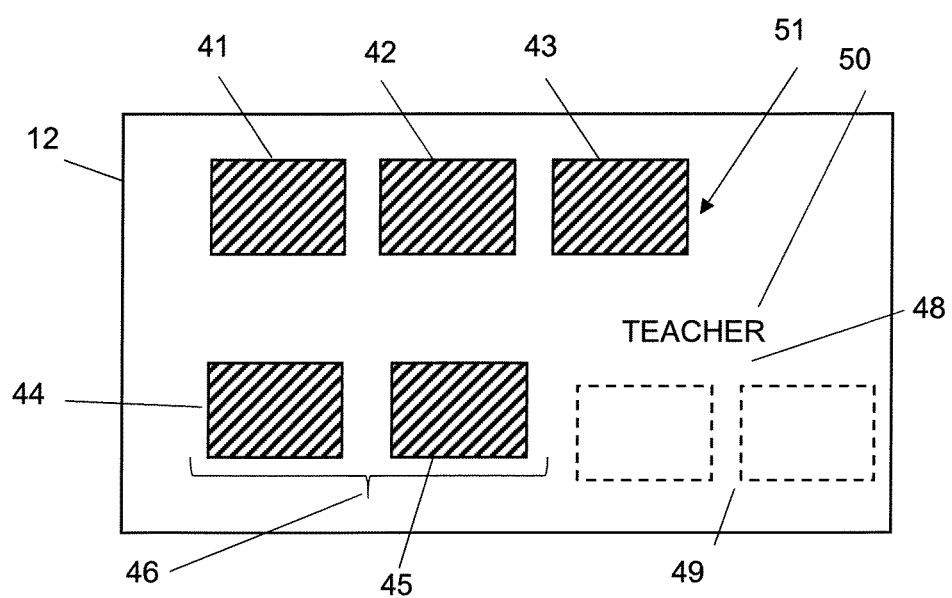
FIG. 3 shows a user interface features.

In logographic languages, written characters can represent respective words or concepts when they occur individually, and can represent other words or concepts when they are grouped together into compounds. An understanding of these relationships can help students to learn the concepts conveyed by the compounds and the individual characters. However, if the visual representation of the characters is complex and not known to a student then the learning benefit that can be derived from these relationships may be reduced. The appearance of the characters may obscure their significance. It has been found that in order to implement a system of the type shown in FIG. 1 it is valuable for the presentational user interface implemented by the user device 1 to be configured to, in at least some situations, disassociate the learning of the appearance of individual written characters from the learning of their pronunciation. FIG. 3 shows a user interface of this type. The display 12 of the device 1 shows a set of placeholder icons 41-45. Each placeholder icon is of a plain appearance in the present example, each placeholder is a rectangle of a uniform colour. Each placeholder represents a logographic character. Different logographic characters may be represented by the same placeholder; or each logographic character may be represented by a respective placeholder, with different logographic characters being represented by different placeholders. Sets of two or more placeholders are grouped together, e.g. as shown at 46. A group of placeholders represents a compound word formed of multiple logographic characters, with one placeholder representing each character in the word. For example, placeholder group 46 may represent the compound word 老师 with one placeholder of the group representing the character 老 and the other placeholder of the group representing the character 师. As is apparent from FIG. 3, the visual complexity of each logographic character is not presented to the user because each character is represented by a respective plain placeholder. The user interface is configured so that an audible representation of each character can be played out to a user when the respective character is indicated. The character may be indicated automatically, by the user device causing the character to be highlighted when the respective audio is played out, or by the user selecting the character using a cursor or by touching the display at the location of the character. When the character is indicated, a spoken audio representation of the character is played out to the user. This user interface permits the spoken aspects of the characters and the significance of their groupings to be learned without confusion arising from the characters' written appearance.

The placeholders described above may function in any suitable way in the user interface. For example, FIG. 3 illustrates an exercise. Placeholders 44, 45 for individual characters are displayed in a first area 48 of the display. In a second area 49 of the display the user interface provides a region where those placeholders can be dragged so as to be arranged in an order chosen by the user. In area 48 or area 49 a meaning 50 is displayed. The user is tasked with dragging the placeholders 44, 45 to the area 49 so as to be displayed in the order that forms a compound word having the meaning 50. The placeholders 44, 45 do not visually represent specific characters. A user can discern which placeholder represents which character by selecting them and listening to the corresponding audio. Once the user understands which placeholder represents which character they can move them to the appropriate order in area 48. For example, placeholder 44 may represent 老 and placeholder 45 may represent 师. The displayed meaning 50 is "teacher". The user selects each character to listen to its audio representation. Then the user can move the placeholders (e.g. by dragging) to the desired order in region 49. In this way, the user interface avoids reliance on or confusion from the visual representation of the individual characters. As described above, the written aspects of the characters can be taught on a separate track. Regions 48 and 49 may overlap. The placeholders may be re-ordered in a single region of the display.

In the example of FIG. 3, the placeholders represent individual characters. In an alternative embodiment, the placeholders may represent phonemes or other components of speech. In an analogous way to that described above, the user interface may be capable of playing out the audio representation of a placeholder when that placeholder is highlighted. The user interface may then enable the user to learn aspects of the use of the phonemes, for example by arranging them to form words or by reading words in which the phonemes appear. For example, when the placeholders represent phonemes, the displayed meaning 50 may be an individual word, an individual character, or a series of two or more words and/or characters.

Each placeholder corresponds to a character of the selected word indicated by meaning 50. The placeholders may initially displayed in an order matching the order of their respective characters in the selected word (as at 51, for example) or in a different order (as at 44, for example). When a user selects one of the placeholders, the system may present information about it, for example its pronunciation (which may be provided in an audio manner), its meaning when appearing individually as a word, other words that use the same character, or the visual appearance of the character represented by the placeholder.

The system described above may be used to implement a cloud-based teaching service. The service may enable operators to create, deliver and manage a curriculum that is flipped, scaffolded and snowballed. 'Snowballing' is an educational model in which contextual materials are comprised exclusively of components that the learner already knows so that they can focus on how the components are used rather than on what the components are. 'Scaffolding' is an educational model in which multiple tasks which the learner needs to perform simultaneously are individually identified. The learner is then supported so that they can focus on one new task at a time. 'Flipped learning' is an educational model in which lower levels of learning are completed by students independently before class so that they can focus on higher levels of learning when a teacher is present.

The typical education hierarchy cascades knowledge down from curriculum designers at the top, through publishers, schools, departments and teachers, to learners at the bottom. By contrast, this service starts with learner and enables different contributors to provide them with increasing depths of support on their learning journey.

The system of FIG. 1 may be used to implement an integrated system that enables schools to provide a consistent experience to all learners and liberates teachers to provide a more personal and creative service. Aspects of the system may include:
 Massive Open Online Course (MOOC) or Virtual Learning Environment—a repository for storing, arranging and distributing resources on a network;
 set of tools for creating a scheme of work, teaching materials, student exercises or other resources to put into that repository;
 set of learning applications like digital flashcards or online games; and
 system for monitoring and reporting on learners' progress.

The system may usefully integrate otherwise disparate elements, and be adaptable to different content and layouts.

Until now, new education technologies have generally been focussed either on facilitating teachers with roles and tasks established before the technology was available; or on enabling learners to study independently of a teacher and, therefore, typically without a structured curriculum. The present system may provide learning within a school curriculum, integrating both independent study and teacher-directed activities.

Curriculum resources have typically hitherto been a fixed package: think of a textbook, where content, methodology and visual style are fixed and inseparable. Whilst the content and methodology may be suitable, it is not possible to change the style (e.g. from something more suitable for junior school children to something more suitable to senior school teenagers). By separating the style from the content, the system allows for the same content to be delivered using the same methodology to different age or cultural audiences by changing the visual templates. Similarly, the system can deliver different content whilst preserving the same methodology and style.

In one embodiment, the system may be tailored to the specific needs of secondary school students studying for an International General Certificate of Secondary Education (iGCSE) examination in Mandarin Chinese. Other embodiments may adapt the same curriculum for use in junior school, as well as the development of further curriculums for different goals such as the International Baccalaureate (IB) Ab Initio and new General Certificate of Secondary Education (GCSE) examinations.

Figure 4:
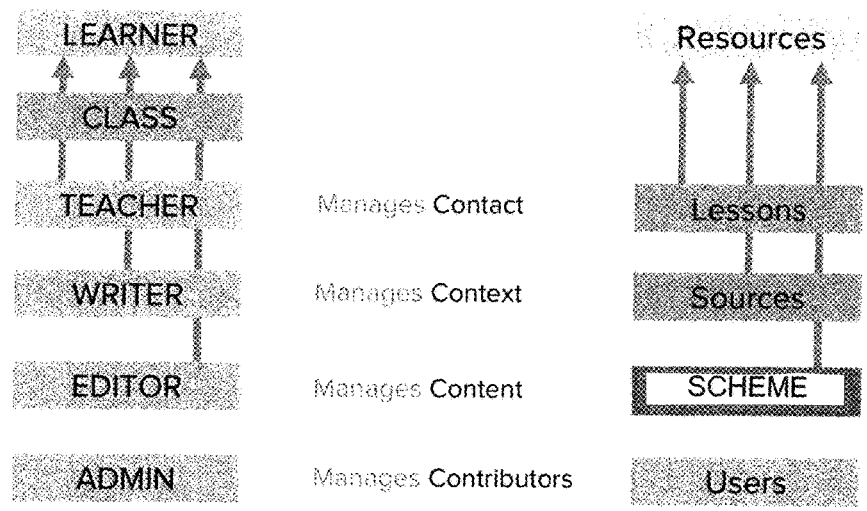
FIG. 4 shows an educational structure.

FIG. 4 shows the roles present in a preferred embodiment of the system of the present invention.

Figure 5:
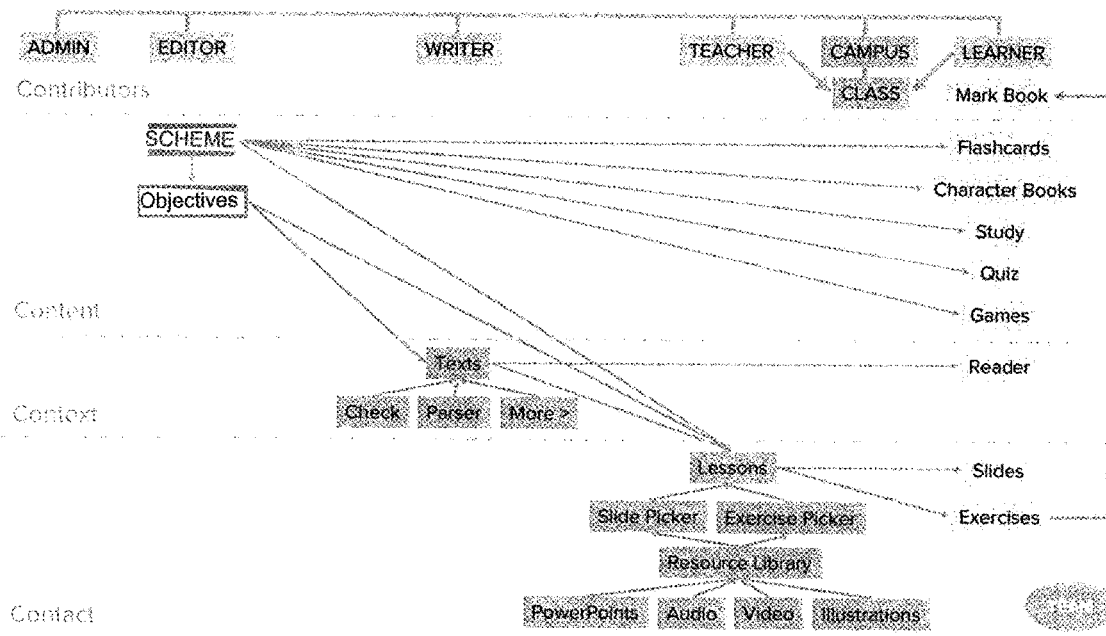
FIG. 5 shows the content structure of a language teaching system.

FIG. 5 shows a "scheme" view of the logical structure of the preferred embodiment of the system of the present invention.

In the preferred embodiment, users register and subsequently sign in online. Each user may be associated in the system with a respective avatar which represents the persona of the user. The avatar may comprise a nickname and/or an image whereby the user can be recognised by other users of the system. Each user may be able to create their own avatar for use in the system. Alternatively, or in addition, each user may be able to create or modify their avatar, for instance by changing its name or image.

Administrators approve users for specific role(s). Higher level users can view lower level roles via an option picker below the avatar of the lower level roles in the heading bar under a "view as" option.

Editors define the scope and sequence of the curriculum material in a scheme along with its objectives. They are also responsible for quality control so are able to make system-wide changes, such as edits to a writer's text or making a lesson visible or invisible to all teachers.

The corpus of learning materials intended to enable a learner to reach a predefined level of skill in a language (e.g. iGCSE) may be termed a scheme. The scheme may be divided into blocks of material termed sections. A section may be suitable for use in a single lesson or learning session, for instance lasting for 60 or 90 minutes. In establishing a teaching programme, it is efficient to first define the objective of the scheme and then to define the text or other content of individual sections. To define the scheme for a target language such as Mandarin Chinese, a user may specify:

which words and grammar structures in the syllabus will be presented together in a section; and what order the sections, or parts of them, will be presented in.

The scheme maps out a learning pathway through the content of the syllabus.

Note: since Mandarin Chinese is not alphabetic, the spoken and written languages can operate quite independently. They may be "scaffolded" and taught separately but in parallel, as the most useful things to hear/say are not necessarily the same as the most useful things to read/write.

Objectives take the form of "I can" statements for each learning block.

The scheme view is available to all users, and it is like a "home page" which is the launch point for the system. The extent of detail provided in the scheme view, and the abilities provided to edit the scheme may vary depending on the rights allocated to the user viewing the scheme. In addition to presenting information about each item in the syllabus (such as pre-recorded or text-to-speech audio of new words, or examples of the grammatical structures retrieved from texts stored in the system), this "home page" includes, for example:

navigation—a tree structure for navigating through different sections and parts of sections;

search—a search box for locating a specific word or structure; and analyse—an input box for entering or pasting text and identifying which parts and what proportion of it have been covered by the end of the specified section.

The content, an example structure of which is shown in the scheme illustrated in FIG. 5, may comprise a number of resources for learners (and teachers). This content may be accessed in a user interface of the system via a suitable menu option: for example, via a "learner" launch button which may be provided in the top right of the scheme view. Examples of such content include:

flashcards—words and characters can be exported into a template and subsequently printed on cards in box sets.

character books—physical and/or network-accessible e-books may be created, for the purpose of permitting a user to trace and/or writing freely each character in each unit of the scheme. Such books may be made available for download in any suitable format, for example PDF format.

study—a flow for learning the content of the scheme, with customisable options and the ability to "bookmark" any item for later review, including auto-bookmarking of items not correctly recalled.

The content may include text defined in written or audio form. Text defined in written form may be presented to a user, or used for testing a user, either visually or in audio form: e.g. by means of a text-to-speech interface. When a piece of text is being used to teach a learner, it may be used to teach speaking, listening, reading or writing skills. In any piece of text, learning may focus on characters or groups of characters such as words, phrases, sentences and larger blocks of text. Learning may also focus on sub-units of characters such as morphemes that make up the pronunciation of the character or strokes or sets of strokes that make up the written representation of the character. Some examples of learning modes will now be described.

For spoken words, the following activities may be available.

Listening activities may include any one or more of:

1. the possibility to hear the sound of a word or part of a word, which may be offered in different voices (e.g. male and female audio and video options), and optionally the possibility to compare the sound to the sound of all or part of any other words in the scheme that comprise the same sound or a similar sound (e.g. the same phonemes but with different tones);

2. the possibility to see the meaning of the word, e.g. by an illustration representing the meaning the word and/or by a representation of the word in another language, such as English, and optionally the possibility to listen to sentences in the texts which contain this word and read their translation; and 3. the possibility to see the spelling in a suitable character system (e.g. using Pinyin syllables plus tone number), and optionally to see other words in the scheme which contain the same spelling, or similar spelling (e.g. the same letters and/or characters but with different tones).

Speaking activities may include any one or more of:
1. seeing the meaning of a word, e.g. by an illustration representing the meaning the word and/or by a representation of the word in another language, such as English;
2. saying a word or series of words and comparing the spoken word to pre-stored audio of another speaker saying the same word or series of words, e.g. in Chinese, and optionally the playback may be compared automatically or by the user with the pre-recording or with a text-to-speech model implemented by the system; and
3. typing the spelling, for example by typing the spelling in a suitable character system (e.g. using Pinyin syllables and tone numbers), and optionally the system may permit the user to persist until they enter the spelling correctly or it may present the correct answer visually after a predetermined number of attempts, e.g. 3.

For sentence patterns, the following activities may be available.

Listening activities may include any one or more of:
1. reading the description and explanation of a grammar point and/or listening to a pre-recorded or machine-generated message explaining the grammar point;
2. hearing an example and reading its translation, drawn from the relevant section's speaking texts, and optionally from further examples; and
3. seeing the spelling of the example (e.g. my use of Pinyin syllables plus tone number), and optionally seeing other words in the scheme which contain the same spelling, or similar spelling (e.g. the same letters with a different tone).

Speaking activities may include any one or more of:
1. seeing a description and explanation of a grammar point;
2. saying a sentence pattern or series of sentence patterns and comparing the spoken word to pre-stored or machine-generated audio of another speaker saying the same sentence pattern or series of sentence pattern, e.g. in Chinese, and optionally the playback may be compared automatically or by the user with the pre-recording or with a text-to-speech model implemented by the system; and
3. typing the spelling of the example, for example by typing the syllables in a suitable character system (e.g. Pinyin including tone numbers) and optionally the system may permit the user to persist until they enter the spelling correctly or it may present the correct answer visually after a predetermined number of attempts, e.g. 3.

For written characters, the following activities may be available.

Reading activities may include any one or more of the following:
1. seeing a character and its typical frequency of use in text of the language being learned, and optionally seeing for that character what words (involving one or multiple characters) in the scheme contain the character, and what sentences in the scheme contain those words;
2. seeing what components the character contains and other characters in the scheme which also contain those components; and
3. seeing the strokes of the character (e.g. by means of an animation of the character being written) and how many strokes the character contains, and optionally seeing other characters in the Scheme with the same number of strokes.

Writing activities may include any one or more of the following:
1. Selecting a new character, e.g. from a choice of a predetermined number such as 6 and optionally the system may permit the user to persist until they select the character correctly or it may present the correct answer visually after a predetermined number of attempts, e.g. 3; and
2. drawing the new character on screen, and optionally the system may permit the user to persist until they draw the character correctly or it may present the correct answer visually after a predetermined number of attempts, e.g. 3.

For written words, the following activities may be available.

Reading activities may include any one or more of the following:
1. seeing the meaning of a word, e.g. by an illustration representing the meaning the word and/or by a representation of the word in another language, such as English, and optionally reading in the language being learned and another language sentences in the texts which contain this word;
2. seeing the word in characters, with an indication of the frequency of occurrence of the word in normal text; and optionally seeing what components each character contains and other characters in the scheme which also contain those components; and
3. seeing the strokes of the character (e.g. by means of an animation of the character being written) and how many strokes the character contains, and optionally seeing other characters in the scheme with the same number of strokes Writing activities may include any one or more of the following:
1. selecting a new word from a choice of a predetermined number, such as 6, and optionally the system may permit the user to persist until they select the word correctly or it may present the correct answer visually after a predetermined number of attempts, e.g. 3; and
2. drawing the new word character by character on screen, and optionally the system may permit the user to persist until they draw the character correctly or it may present the correct answer visually after a predetermined number of attempts, e.g. 3.

The system may be capable of presenting other activities. One such activity is a quiz. A quiz may be considered to be a flow for testing the listening, speaking, reading and/or writing skills with the words in the scheme. Customisable options may be available. The user may have the ability to "bookmark" any item for later review. The system may automatically-bookmark items not correctly recalled by the user. The system may randomly select from multiple available types for each question for each skill.

Examples of listening quiz activities include: (1) hearing a word (e.g. in response to the actuation by the user of an audio button) and selecting a correct word in another language from choice of a predetermined number of words, e.g. 6, and (2) seeing a representation of the meaning of a word, e.g. by illustration and/or an audio explanation, and selecting the correct audio from a choice of a predetermined number, e.g. 6.

Examples of speaking quiz activities include: (1) saying a word, which may be recorded and compared as described for studying, and (2) spelling a word syllable by syllable, as described for studying.

Examples of reading quiz activities include: (1) seeing a word in characters and selecting the correct representation of it in another language from a choice of a predetermined number, e.g. 6, and (2) seeing a representation of a word's meaning, e.g. by illustration and/or an audio explanation, and selecting the correct characters from a choice of a predetermined number, e.g. 6.

Examples of writing quiz activities include: (1) seeing a representation of a word's meaning, e.g. by illustration and/or an audio explanation and selecting the correct characters from a choice of a predetermined number, e.g. 6, and (2) seeing a representation of a word's meaning, e.g. by illustration and/or an audio explanation and drawing the correct characters on-screen one by one.

The system may be capable of implementing games, for example, a range of games for reinforcing learning of the content of the scheme through play. For example, a user may select from a range of contexts in which numbers might be used (plain digits, cardinals, ordinals, times, dates, length etc.) and which skills they want to practice. Random numbers may be generated in the appropriate format for translation from or into the language being learned, with a "check" button beneath each displayed number to reveal the correct answer.

As indicated above, the scheme shown in FIG. 5 is a logical structure defining at a general level the inputs that can be provided by users having certain roles in the operation of the system and the activities that can be performed by a learner. The scheme is defined by users designated as editors. Once the scheme has been defined by the editors, users designated as writers can access a screen view that presents a representation of certain aspects of the scheme. That interface may present a number of menu options. One such option may be a text writing interface. The text writing interface may be presented via a "write" launch button that may be provided in the screen view of the scheme. The "write" button may be in the top right of the scheme view. An editor can use the text writing interface to enter certain learning and/or testing materials that can be employed in a section of the language course. The section may be themed by being for a predetermined level of user or by relating to a predetermined topic or in any other suitable way. On selecting the text writing interface, the writer will then be prompted to enter, in a series of subsequent pages, any one or more of the following:

a scenario—a realistic situation which the learner might find themselves in which would require them to use the language of this section;
objectives—this allows for adjustment of the scheme's objectives, if necessary, from any default objectives that might be offered by the system;
a product—something spoken that the learner can produce to demonstrate that they have achieved the objectives (e.g. a role-play conversation);
a listening script—a script that can be recorded or read using text-to-speech for something which the learner might realistically hear;
a speaking product—a model product that the learner can copy, for example by performing the listening and speaking exercises described above that involve replicating a pre-prepared written text or audio segment;
reading texts—pieces of text (notices, messages, stories etc.) which the learner might realistically see; and
writing products—pieces of text (notes, messages, emails etc.) which the learner might realistically need to write.

For each piece of text entered by the text writing interface, for example, as a product, a listening script, a speaking product, a reading text or a writing product, there is a check facility which is intended to check that the content of the text is appropriate to the level of learning to which the relevant section is directed. The check facility may, for example, analyse the relevant text to ensure that criteria such as the following ones are met by the piece of text.

In the case of a piece of text that may be used for listening and/or speaking exercises, the criteria may be:
that all words intended to be introduced as new words in that section have been introduced; these words may be defined as part of the scheme;
that all sentence patterns intended to be introduced as new sentence patterns in that section have been introduced; these sentence patterns may be defined as part of the scheme;
that the new words and/or sentence patterns (as discussed above) constitute a minority of the text; and
that only words from this and previous sections in the intended learning flow have been used.

For texts that may be used for reading and/or writing exercises, the criteria may be:
that all characters intended to be introduced as new characters in that section have been introduced; these characters may be defined as part of the scheme;
that the new characters (as discussed above) constitute a minority of the text; and
that only characters from this and previous sections in the intended learning flow have been used.

These criteria can help to check that the text will be suitable for a learner by ensuring that all elements intended to be learned in a section are presented, that the section will provide support by relying on previously-learned elements and that the section does not present spurious novel elements.

The system may also provide the facility to, for each piece of text, parse portions of the text and add comments such as translations and/or notes of explanation. Those comments may be displayed by the system when a user is viewing the text, for example when the user moves a cursor over the relevant portion of the text. Portions of the text may optionally be indicated in the text as an array of characters between punctuation marks. The portions may, for example, be one or more characters, words or phrases.

For each piece of text there is also the facility to add more details, for example, a note or description, an illustration, an audio file; and/or cue cards. The cue cards are prompts in a language other than the language being learned which are intended to help the learner reproduce the text themselves.

The system may be capable of displaying a reader tool for presenting a piece of text to any user. The reader tool may provide a context option when a user who is viewing a piece of text selects a sub-portion of that piece of text. The sub-portion may, for example, be a character, a word or a phrase. When a user selects the context option the system may present one or more predefined comments or other pieces of text that are related to the selected sub-portion. When the system is presenting a piece of text, it may permit the user to select some or all of that text and to then invoke an option to cause the system to activate an audio player which can play out pre-recordings of the selected text or an automated text-to-speech rendition of the selected text.

One example of a listening exercise may function as follows. A piece of text is selected, either manually by the user or automatically by the system. Each character of the text is presented on screen as a plain icon, such as an empty box. Punctuation marks between characters are preserved. When the user moves a cursor over any string of text (which may, for example be done by means of a mouse or touch-screen) the system displays a translation of that string into a language other than the language being learned (e.g. English). When the user selects a string of text (e.g. by clicking or double-tapping a touch screen) the system reveals a transcription of the string of text into a phonetic character set (e.g. Pinyin) and any notes of explanation that have been defined in the system. The system may provide the facility to toggle the displayed phonetic character set to display corresponding characters, e.g. logographic characters. A displayed piece of text can be interacted with in this way to break the string of text into words, words into syllables/ characters and characters into components.

One example of a speaking exercise may function as follows. A piece of text is selected, either manually by the user or automatically by the system. The translation of each string of the text is presented on screen, with the punctuation marks preserved. When the user moves a cursor over any string of text the system displays a transcription of the string of text in a phonetic character set (e.g. Pinyin) and/or provides an audio representation of the phonetic character set by means of an audio player.

One example of a reading or writing exercise may function as follows. A piece of text is selected, either manually by the user or automatically by the system. Each character of the text is presented on screen as a plain icon, such as an empty box. Punctuation marks between characters are preserved. When the user moves a cursor over any string of text the system displays the translation of that string of text into a language other than the language being learned.

Contact with the learner is managed by teachers primarily through physical lessons. Teachers and learners are linked to classes within a school campus or online. The link between the learners and teachers are displayed in each user's account (under a section having a title such as "my account"), accessed, for example, via an avatar on the top right corner of any page of the system. Help pages, including a contact form, are also accessible from the user's account.

Lessons are sequences of activities with time allocations assigned to them and (optionally) with slides and/or exercises attached to them. Lessons (and their associated slides and/or exercises) can be shared with other classes and/or other teachers. All lessons that are visible to a user are listed on the learn and/or teach pages for each section.

Any teacher can duplicate a lesson that is visible to them in order to make edits and/or to share it, for example, with learners or other teachers. Such a sharing function may be implemented in any suitable way, for example a teacher may send a message to a learner or teacher directing their attention to the lesson, or they may add the lesson to workflow specific to that learner or teacher. Any teacher can also add notes, including attachments and links, to a lesson.

The details of activities that can be performed in the system are stored in the system's database for quick access and consistency. Any teacher can add new activities to the database. Sections may be associated with activities. Activities may be defined with one or more attributes such as the skills they can be used to train (e.g. listening, speaking, reading and writing). When a search is performed in the system for an activity that search may be filtered by those attributes.

Slides can be added to lesson activities using a slide picker, which presents a variety of slide types to choose from and customise via an options and/or uploads interface.

The system may provide an exercise picker function. The exercise picker function may permit exercises to be added to the learning path for a specific learner or group of learners. Each exercise may comprise one or more of the listening, speaking, reading or writing activities described above. Each exercise may be marked manually by a teacher, or may be marked automatically by the system by comparison of the input provided by the learner with a pre-stored indication of acceptable answers. In order to manually mark an exercise, a teacher can access the system and view and/or listen to the inputs provided by students in response to an exercise. The system permits the teacher to input marks and comments in response to the learner's inputs, and to define further exercises for the user in dependence on their past performance. When a learner completes an exercise, the system may inform the relevant teacher, for example, by sending a message to the teacher or by adding the marking of that exercise to the teacher's workflow.

An exercise may be designated as compulsory or optional. A compulsory exercise is one that is required to be performed by a learner before they can proceed further. An optional exercise is one that can optionally be omitted by the learner.

When a learner completes an exercise, the answers (including uploaded audio visual files, if any) are stored along with their mark and any teacher comments. This data is viewable by the learner and their teacher via a section having a title such as "my markbook" (for example, accessed via the avatar in the top right corner of any page of the system), which provides both statistical analysis and evidence records for each learner.

The resource library is a web-interface that uses file names and database entries to display any files that have been uploaded in a way that is filterable and searchable. This allows teachers to use standard and approved files, saving them time and improving consistency of learner experience.

It is hereby disclosed in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. Aspects of the present invention may consist of any such individual feature or combination of features. In view of the foregoing description it will be evident to a person skilled in the art that various modifications may be made within the scope of the invention.

What is claimed is:

1. A computer system configured to implement a user interface for the teaching of a logographic language, the system being configured to:
   select a word in the logographic language that is represented in the language by multiple written characters;
   cause multiple placeholder icons to be displayed to a user of the system, there being one placeholder icon for each character of the selected word;
   enable the user to select one of the placeholder icons and to re-order the placeholder icons on a display;
   initially display the placeholder icons such that not all of the placeholder icons correspond to the character of the selected word having the same order in the selected word as the respective placeholder icon in the set of placeholder icons; and
   in response to the user re-ordering the placeholder icons such that each placeholder icon corresponds to the character of the selected word having the same order in the selected word as the respective placeholder icon in the set of placeholder icons, present a message to the user causing information to be presented to the user relating to a corresponding character of the selected word.

2. A computer system as claimed in claim 1, wherein each placeholder icon has an appearance different from the appearance of any character in the logographic language.

3. A computer system as claimed in claim 1, wherein all the placeholder icons have the same appearance.

4. A computer system as claimed in claim 3, wherein the placeholder icons are geometric shapes of a common colour.

5. A computer system as claimed in claim 1, wherein the placeholder icons are displayed side-by-side.

6. A computer system as claimed in claim 1 wherein the system is configured to cause information to be presented to the user that is one of (i) the meaning of the corresponding character of the selected word in isolation and (ii) other words that comprise the corresponding character of the selected word.

7. A computer system as claimed in claim 1 wherein the system is configured to cause information to be presented to the user that is the pronunciation of the corresponding character of the selected word.

8. A computer system as claimed in claim 7, wherein the system is configured to present the pronunciation to the user in audio form.

9. A computer system as claimed in claim 1, wherein the system is configured to enable the user to re-order the placeholder icons by selecting one of the displayed placeholder icons in a first ordered position relative to the or each other displayed placeholder icon and moving it to a different ordered position relative to the or each other displayed placeholder icon.

10. A computer system as claimed in claim 1, wherein the system is configured to enable the user to re-order the placeholder icons by dragging and dropping.

\* \* \* \* \*